United States Patent
Yamamura et al.

(10) Patent No.: US 7,751,962 B2
(45) Date of Patent: Jul. 6, 2010

(54) VEHICLE TRAVEL CONTROLLING APPARATUS AND METHOD

(75) Inventors: Yoshinori Yamamura, Yokohama (JP); Yoji Seto, Yokohama (JP); Masahide Nakamura, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 674 days.

(21) Appl. No.: 11/712,791

(22) Filed: Mar. 1, 2007

(65) Prior Publication Data

US 2007/0208485 A1 Sep. 6, 2007

(30) Foreign Application Priority Data

Mar. 2, 2006 (JP) ............................ 2006-056364

(51) Int. Cl.
*B60T 8/32* (2006.01)

(52) U.S. Cl. ..................................... 701/93; 701/207

(58) Field of Classification Search .................. 701/70, 701/93, 71, 72, 200, 207, 208; 340/441
See application file for complete search history.

(56) References Cited

U.S. PATENT DOCUMENTS

| | | | |
|---|---|---|---|
| 6,188,316 B1 * | 2/2001 | Matsuno et al. ............. | 340/441 |
| 6,208,927 B1 * | 3/2001 | Mine et al. .................... | 701/70 |
| 6,272,416 B1 * | 8/2001 | Kuroda et al. ................. | 701/70 |
| 6,278,928 B1 * | 8/2001 | Aruga et al. .................. | 701/65 |
| 6,298,296 B1 * | 10/2001 | Takahashi .................... | 701/70 |
| 6,392,535 B1 | 5/2002 | Matsuno et al. | |
| 6,577,937 B1 * | 6/2003 | Shuman et al. ............... | 701/48 |
| 6,778,896 B1 * | 8/2004 | Matsuura et al. .............. | 701/70 |
| 7,266,438 B2 * | 9/2007 | Kellum et al. ................. | 701/93 |
| 2007/0150157 A1 * | 6/2007 | Lee et al. ...................... | 701/93 |

FOREIGN PATENT DOCUMENTS

JP    2005-135178    5/2005

* cited by examiner

*Primary Examiner*—Khoi Tran
*Assistant Examiner*—Stephen Holwerda
(74) *Attorney, Agent, or Firm*—Young Basile

(57) ABSTRACT

A vehicle travel controlling apparatus and method in which a target vehicle speed for when a vehicle travels along a curve is calculated based on a radius of the curve, and the vehicle speed is controlled based on the calculated target vehicle speed. When an accelerator operation performed by a driver is detected, the controller corrects the target vehicle speed based on a vehicle position where the acceleration operation is performed.

20 Claims, 11 Drawing Sheets

(0) : CURRENT POSITION

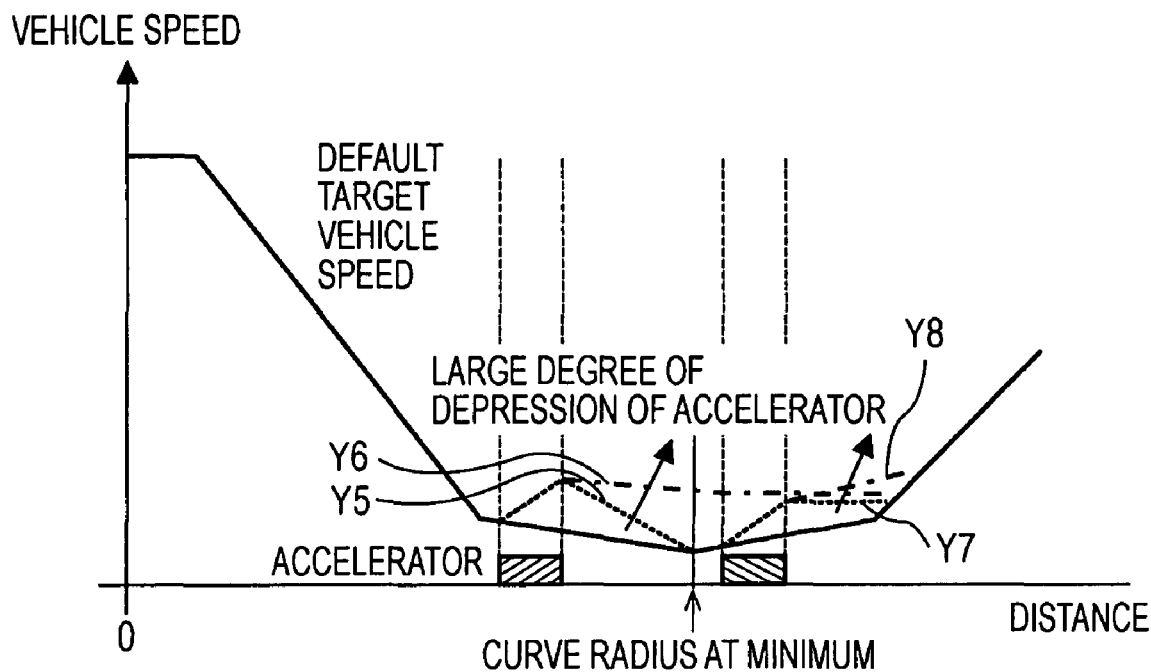
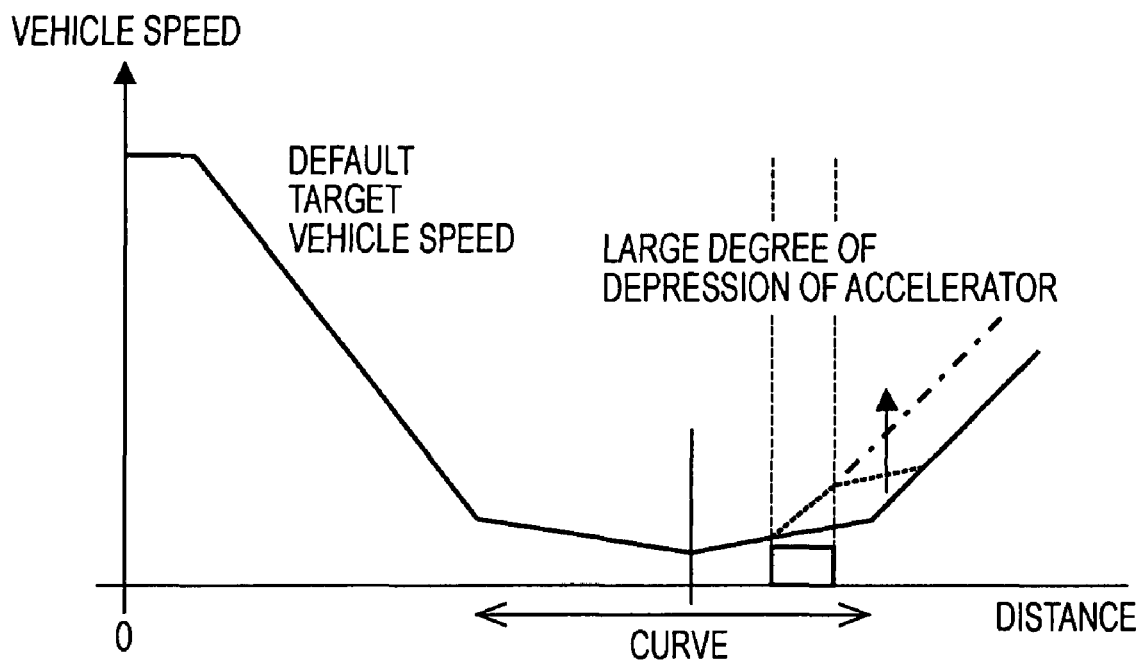

VEHICLE TRAVEL CONTROLLING APPARATUS AND METHOD

CROSS-REFERENCE TO RELATED APPLICATION

This application claims priority from Japanese Patent Application Serial No. 2006-056364, filed Mar. 2, 2006, which is incorporated herein in its entirety by reference.

TECHNICAL FIELD

The present invention relates in general to an apparatus and method that controls traveling of a vehicle.

BACKGROUND

A device that controls deceleration on the basis of a road curvature of a curve and a travel state of one's own vehicle is known from Japanese Unexamined Patent Application Publication No. 2005-135178. In this related technology, deceleration control is operated as a result of making a deceleration degree large when a driver stops an acceleration operation.

BRIEF SUMMARY OF THE INVENTION

Embodiments of a control apparatus for a vehicle are taught herein. According to one example, the apparatus comprises a vehicle position detector configured to detect a traveling position of the vehicle, an accelerator operation detector configured to detect an accelerator operation by a driver and a controller. The controller is operable to calculate a target vehicular speed for cornering a curve in a path of the vehicle based on a radius of the curve, correct the target vehicular speed based on the traveling position where the accelerator operation is detected by the accelerator operation detector and control a vehicular speed based on the target vehicular speed.

Another example of a control apparatus for a vehicle comprises means for detecting a traveling position of the vehicle, means for detecting an accelerator operation by a driver, means for calculating a target vehicular speed for cornering a curve in a path of the vehicle based on a radius of the curve, means for correcting the target vehicular speed based the traveling position where the accelerator operation is detected by the accelerator operation detecting means and means for controlling a vehicular speed based on the target vehicular speed.

Control methods for a vehicle are also taught herein. One such method comprises, for example, detecting an accelerator operation by a driver, calculating a target vehicular speed for cornering a curve in a path of the vehicle based on a radius of the curve, correcting the target vehicular speed based on a position of the vehicle with respect to the curve, the position occurring when the accelerator operation by the driver is detected, and controlling a vehicular speed based on the target vehicular speed.

BRIEF DESCRIPTION OF THE DRAWINGS

The description herein makes reference to the accompanying drawings wherein like reference numerals refer to like parts throughout the several views, and wherein:

FIG. 9 shows a default target vehicle speed for when the vehicle travels into the curve and target vehicle speeds for when the driver operates the accelerator pedal at an interval from the entrance of the curve to a point where a curve radius is a minimum and at an interval from the point where the curve radius is a minimum to an exit of the curve;

FIG. 10 shows a change in the vehicle speed when the driver depresses the accelerator pedal at a point within a predetermined distance from the exit of the curve (e.g., near the exit of the curve) when a deceleration control is operated;

DETAILED DESCRIPTION OF EMBODIMENTS OF THE INVENTION

Figure 1:
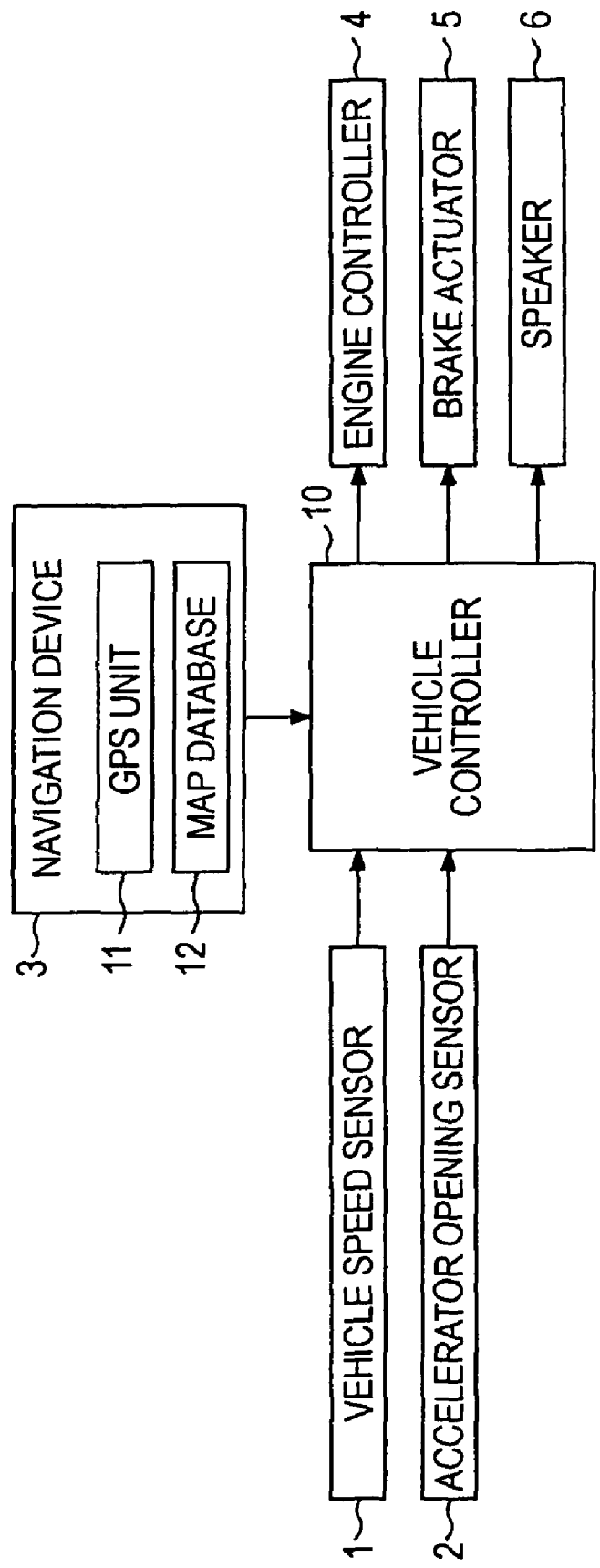
FIG. 1 shows a structure of a vehicle travel controlling device according to a first embodiment.

In the related technology such as that described in Japanese Unexamined Patent Application Publication No. 2005-135178, the deceleration degree is uniformly made large regardless of a timing or a degree of the acceleration operation performed by the driver. As a result a deceleration controlling operation that reflects an intended acceleration operation of the driver may not be performed.

In contrast, embodiments of the invention can calculate a target vehicle speed of a vehicle when the vehicle travels along a curve based on a radius of the curve located in front of the vehicle. The target vehicle speed is corrected when an operation of an accelerator by a driver is detected, the correction based on a vehicle position at the curve for when the operation of the accelerator is completed. That is, when the operation of the accelerator by the driver is detected during operation of a deceleration control, the target vehicle speed is corrected on the basis of the vehicle position at the curve for when the operation of the acceleration is completed. Therefore, it is possible to properly control a vehicle speed so as to reflect an intended acceleration operation of the driver. Details of embodiments of the invention are shown with reference to the drawing figures.

FIG. 1 shows a structure of a vehicle travel controlling device according to a first embodiment. The vehicle travel controlling device according to the first embodiment includes a vehicle speed sensor 1, an accelerator opening sensor 2, a navigation device 3, an engine controller 4, a brake actuator 5, a speaker 6 and a vehicle controller 10. The controller 10 generally comprises a microcomputer including a central processing unit (CPU), input and output ports (I/O), random access memory (RAM), keep alive memory (KAM), a common data bus and read-only memory (ROM) as an electronic storage medium for executable programs and certain stored values as discussed hereinafter. The controller 4 is generally a standard engine microcontroller as well-known in the art.

The vehicle speed sensor 1 detects a vehicle speed. The accelerator opening sensor 2 detects an opening of an accelerator corresponding to an amount of operation of an accelerator pedal. The engine controller 4 controls an output of an engine as a result of controlling, for example, an opening of a throttle valve (not shown) based on a command from the vehicle controller 10. The brake actuator 5 controls braking of the vehicle on the basis of a command from the vehicle controller 10. The speaker 6 generates a warning on the basis of a command from the vehicle controller 10.

The navigation device 3 includes at least a GPS unit 11 and a map database 12. It performs the general operations of a car navigation system, such as computing a recommended route to a destination and displaying a map including a current position of the vehicle and the vicinity of the current position of the vehicle. The GPS unit 11 receives a GPS signal transmitted from a GPS satellite (not shown) to detect the current position of one's vehicle. The map database 12 stores map data of a plurality of reduction scales.

The vehicle controller 10 calculates a target vehicle speed for when the vehicle travels along a curve based on a road curvature. In addition, the vehicle controller 10 gives out a deceleration command to the brake actuator 5 so that the vehicle speed that is detected by the vehicle speed sensor 1 becomes equal to or less than the target vehicle speed. Further, when an operation of the accelerator pedal by a driver is detected during an operation of a decelerator control, the vehicle controller 10 corrects the target vehicle speed on the basis of the position of the vehicle when the accelerator pedal is operated and the amount of operation of the accelerator pedal.

Figure 2:
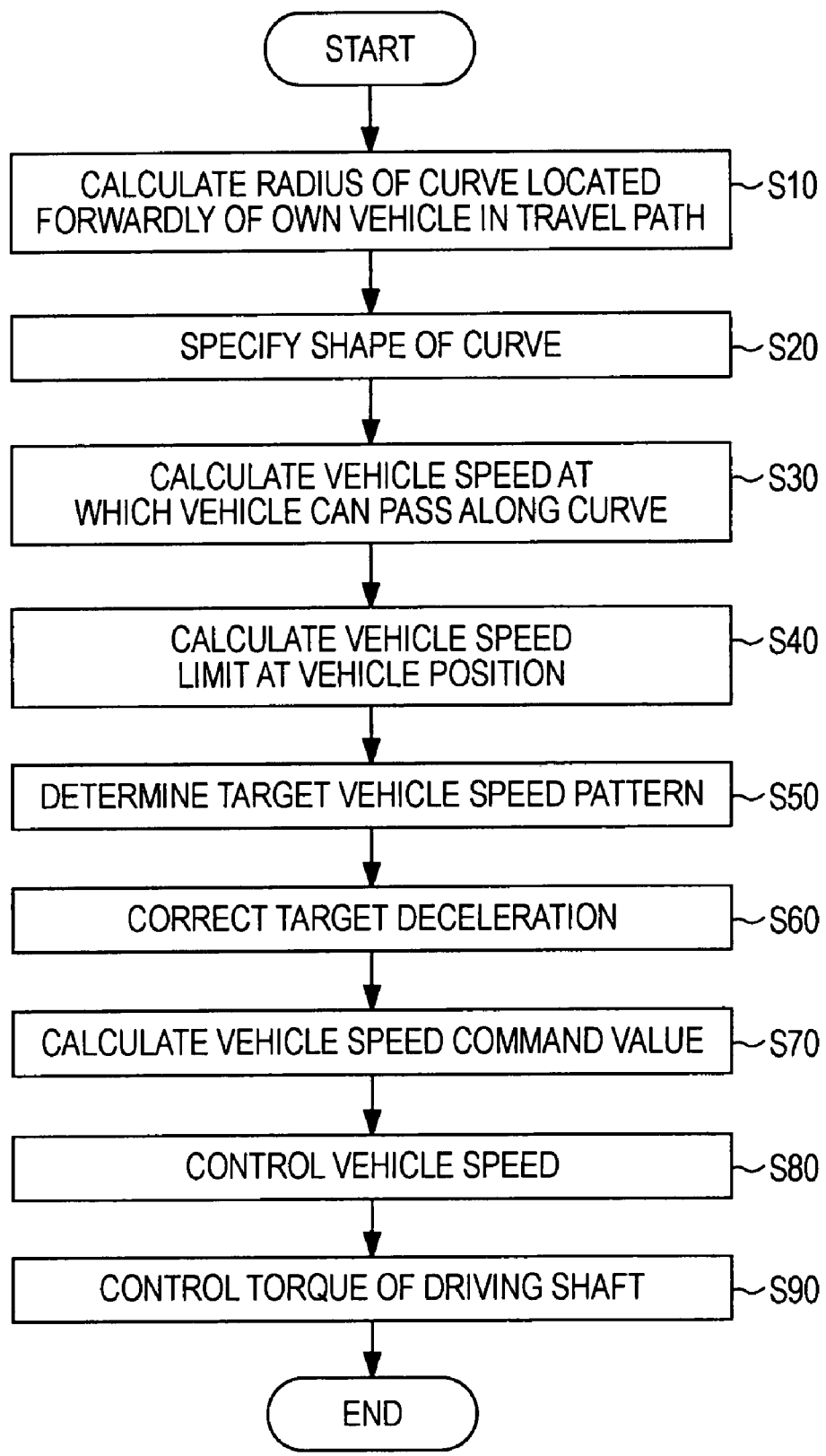
FIG. 2 is a flowchart of the steps of a controlling process that is performed by the vehicle travel controlling device according to the first embodiment.

FIG. 2 is a flowchart of the steps of a controlling process that is performed by the vehicle travel controlling device according to the first embodiment. When the vehicle is started, the vehicle controller starts step S10. In step S10, radii of a curve that exists forwardly of the position of one's own vehicle in a travel path of the vehicle is calculated. The method of calculating the radii of the curve is described below.

Figure 3:
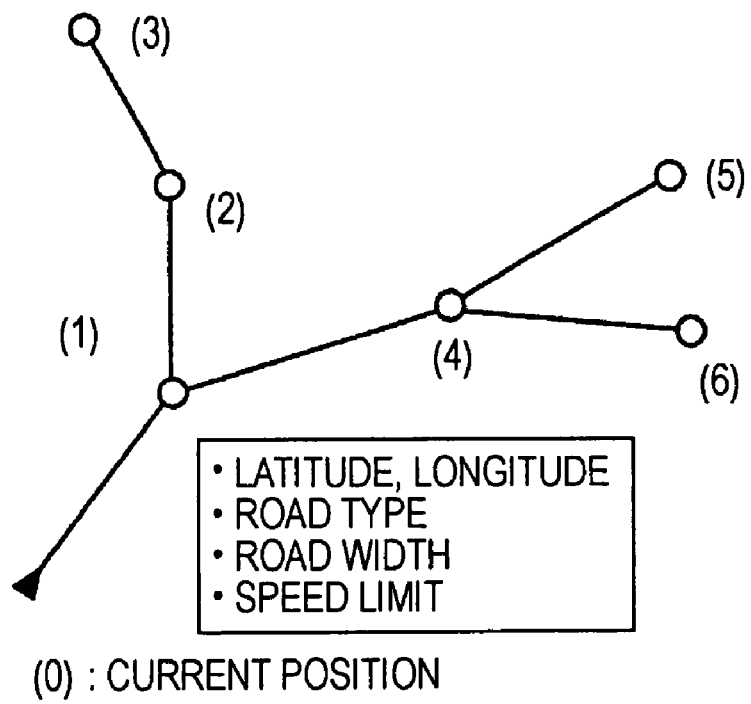
FIG. 3 shows an example of road data that is read out from a map database.

First, with the vehicle position detected by the GPS unit 11 serving as a reference (node 0), the vehicle controller 10 reads from the map database 12 road data regarding an area within a predetermined range that is situated forwardly of the vehicle. FIG. 3 shows an example of road data that is read out from the map database 12. The items of the road data that are read out from the map database 12 include latitudes/longitudes of respective nodes (1)-(6) included in the road data, road types, road widths and speed limits.

Next, an estimated route that can be taken when the vehicle travels is specified. For example, when a user sets a destination with the navigation device 3, and a recommended route to the destination is computed, the computed recommended route is set as the estimated route. When a destination is not set by the user, on the basis of data such as the road type and road width, the user sets an order of priority of routes that may be taken as the vehicle travels forward and sets the route of the highest order of priority as the estimated route. It is assumed that the estimated route includes n nodes (n is an integer) that are disposed forwardly of the position of the vehicle.

Figure 4:
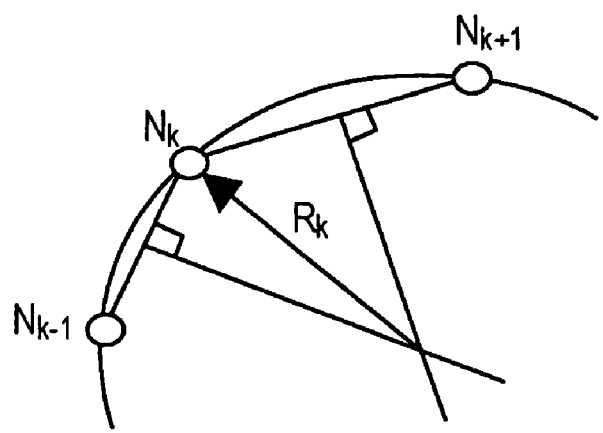
FIG. 4 shows a radius of a circle that passes through three nodes, nodes Nk−1, Nk and Nk+1.

The curve radii are calculated in terms of the nodes $N_k$ (k=1, 2, ..., n) of the estimated route. For example, the curve radius at the position of the node $N_k$ is calculated on the basis of positional coordinates of the node $N_k$ and nodes $N_{k-1}$ and $N_{k+1}$ adjacent to the node $N_k$. FIG. 4 shows a radius $R_k$ of a circle that passes through the three nodes $N_{k-1}$, $N_k$ and $N_{k+1}$. When the positional coordinates of the nodes $N_{k-1}$, $N_k$ and $N_{k+1}$ are $(X_{k-1}, Y_{k-1})$, $(X_k, Y_k)$ and $(X_{k+1}, Y_{k+1})$, respectively, the radius $R_k$ is calculated by the following formula (1):

$$R_k = \sqrt{(Xr^2 + Yr^2)}; \tag{1}$$

wherein $$Xr = (CaYb - CbYa)/(XaYb - XbYa); \tag{2}$$

$$Yr = (CbXa - CaXb)/(XaYb - XbYa); \tag{3}$$

$$Ca = (Xa^2 - Ya^2)/2; \tag{4}$$

$$Cb = (Xb^2 - Yb^2)/2; \tag{5}$$

$$Xa = X_{k-1} - X_k; \tag{6}$$

$$Ya = Y_{k-1} - Y_k; \tag{7}$$

$$Xb = X_{k+1} - X_k; \text{ and} \tag{8}$$

$$Yb = Y_{k+1} - Y_k. \tag{9}$$

When the curve radii $R_k$ are calculated in terms of the nodes $N_k$ (k=1, 2, ..., n), the calculated values are stored along with pieces of data of distances $L_k$ from the vehicle position to the nodes $N_k$ in a memory in the forms of $(N_1, L_1, R_1)$, $(N_2, L_2, R_2)$, ..., $(N_n, L_n, R_n)$.

After step S10, in step S20 the shape of the curve is specified. Here, a node corresponding to an entrance of the curve, a node corresponding to an exit of the curve and a node where the curve radius is a minimum are determined. The node corresponding to the entrance of the curve is a node obtained when the curve radius $R_k$ is smaller than a predetermined value Rin as a result of comparing the predetermined value $R_{in}$ and the curve radii $R_k$, which are obtained in step S10, in the order of smaller values of k. For example, if the curve radii $R_1$ and $R_2$ are larger than the predetermined value $R_{in}$ and the curve radius $R_3$ is smaller than the predetermined value $R_{in}$, the node $N_3$ becomes the node corresponding to the entrance of the curve. The node corresponding to the exit of the curve is a node obtained when the curve radius $R_k$ is larger than a predetermined value $R_{out}$ as a result of comparing the curve radii $R_k$ (for the nodes following the curve entrance node) and the predetermined value $R_{out}$ in the order of smaller values of k.

In step S30 a passable vehicle speed $V_{ck}$ that allows the vehicle to travel at a previously set lateral acceleration $\alpha_y$ (such as 3.0 m/s$^2$) along the curve that is situated forwardly of the vehicle is calculated. The passable vehicle speed $V_{ck}$ at each node $N_k$ is determined by the following formula (10):

$$V_{ck} = \sqrt{(\alpha_y \cdot R_k)} \tag{10}$$

wherein $R_k$ is the curve radius at the position of node $N_k$.

Figure 5:
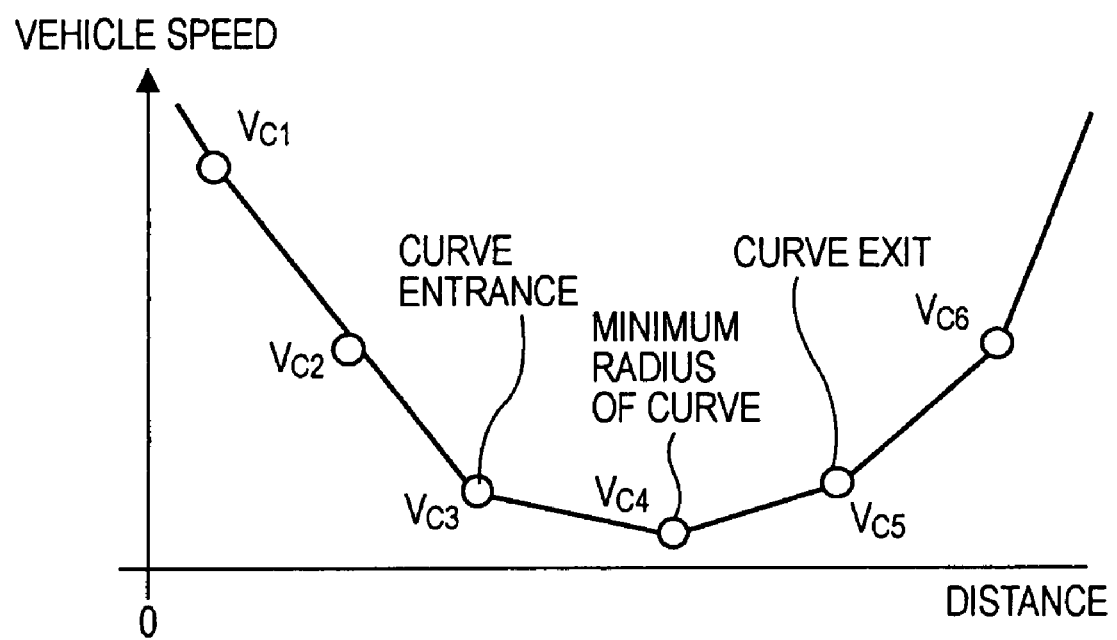
FIG. 5 shows a relationship between the distance from a current position of a vehicle and the vehicle speed at which the vehicle can pass along a curve.

FIG. 5 shows a relationship between the distance from a current position of the vehicle and the passable vehicle speed $V_{ck}$. The passable vehicle speed $V_{ck}$ is a minimum at a point where the curve radius is a minimum. Hereunder, the distance from the position of the vehicle to the curve entrance node is $L_{cin}$, the distance from the position of the vehicle to the node where the curve radius is a minimum is $L_{cmin}$, and the distance from the position of the vehicle to the curve exit node is $L_{cout}$.

In step S40 a speed limit $V_{cck}$ at the current position of the vehicle is calculated on the basis of the passable vehicle speed $V_{ck}$ calculated in step S30 and the distance $L_k$ from the position of the vehicle to the node $L_k$, the distance $L_k$ being stored in the memory. The speed limit $V_{cck}$ is a vehicle speed at the node $N_k$ that becomes equal to the passable vehicle speed $V_{ck}$ when the vehicle is decelerated by a predetermined deceleration $\alpha_x$ (such as 1.0 m/s$^2$) from the position of one's vehicle and is determined by the following formula (11):

$$V_{cck} = \sqrt{(V_{ck}^2 + 2 \cdot \alpha_x \cdot L_k)} \quad (11)$$

After step S40, in step S50 a target vehicle speed pattern is computed. First, the node where the speed limit becomes a minimum among the speed limits $V_{cck}$ calculated in step S40 in terms of the nodes in the estimated route is specified. Here, this specified node is represented by $N_k^*$, the passable vehicle speed at the node $N_k^*$ is $V_{ck}^*$ and the distance from the position of the vehicle to the node $N_k^*$ is $L_k^*$.

A target deceleration from the vehicle to the node $N_k^*$ is the specified value $\alpha_x$, and a target vehicle speed $V_{ok}^*$ at a distance L from the position of the vehicle within an interval to the node $N_k^*$ is determined by the following formula (12):

$$V_{ok}^* = \sqrt{(2 \cdot \alpha_x \cdot (L_0^* - L))} \quad (12)$$

wherein $L_0^*$ is a value that is represented by the following formula (13):

$$L_0^* = (V_{ck}^{*2} + 2 \cdot \alpha_x \cdot L_k^*)/(2 \cdot \alpha_x) \quad (13)$$

A target vehicle speed at a position beyond the node $N_k^*$ is determined by the following formula (14). More specifically, formula (14) is used to determine a target vehicle speed at a distance L from the position of the vehicle within an interval between the node $N_k$ and the node $N_{k+1}$. In formula (16), the value $\alpha_{kk+1}$ is a target deceleration speed between the nodes $N_k$ and $N_{k+1}$.

$$V_{KK+1} = \sqrt{\{2\alpha_{KK+1}(L_0 - L)\}} \quad (14)$$

$$\text{wherein } L_0 = L_{K+1} \cdot V_{ck}^2 - L_k \cdot V_{ck+1}^2/(V_{ck}^2 - V_{ck+1}^2); \text{ and} \quad (15)$$

$$\alpha_{KK+1} = 0.5 \cdot (V_{ck}^2 - V_{ck+1}^2/(L_{k+1} - L_k)). \quad (16)$$

The pieces of data of the target vehicle speed and the target deceleration calculated on the basis of the formulas (12) to (16) are stored along with the distance-L data in memory. For example, they are stored in the memory in the form of (L, $V_{CMD\_D}(L)$, $\alpha_D(L)$) along with the distances L from one's vehicle. The target vehicle speed $V_{CMD\_D}(L)$ and the target deceleration $\alpha_D(L)$ in accordance with the distances L are default values when there is no operation of the accelerator by the driver during deceleration control. When the target vehicle speed and the target deceleration are calculated, the process advances to step S60.

When the vehicle speed detected by the vehicle speed sensor 1 is greater than the target vehicle speed, the controller 10 sets a control start flag FBSTT to 1.

Figure 6:
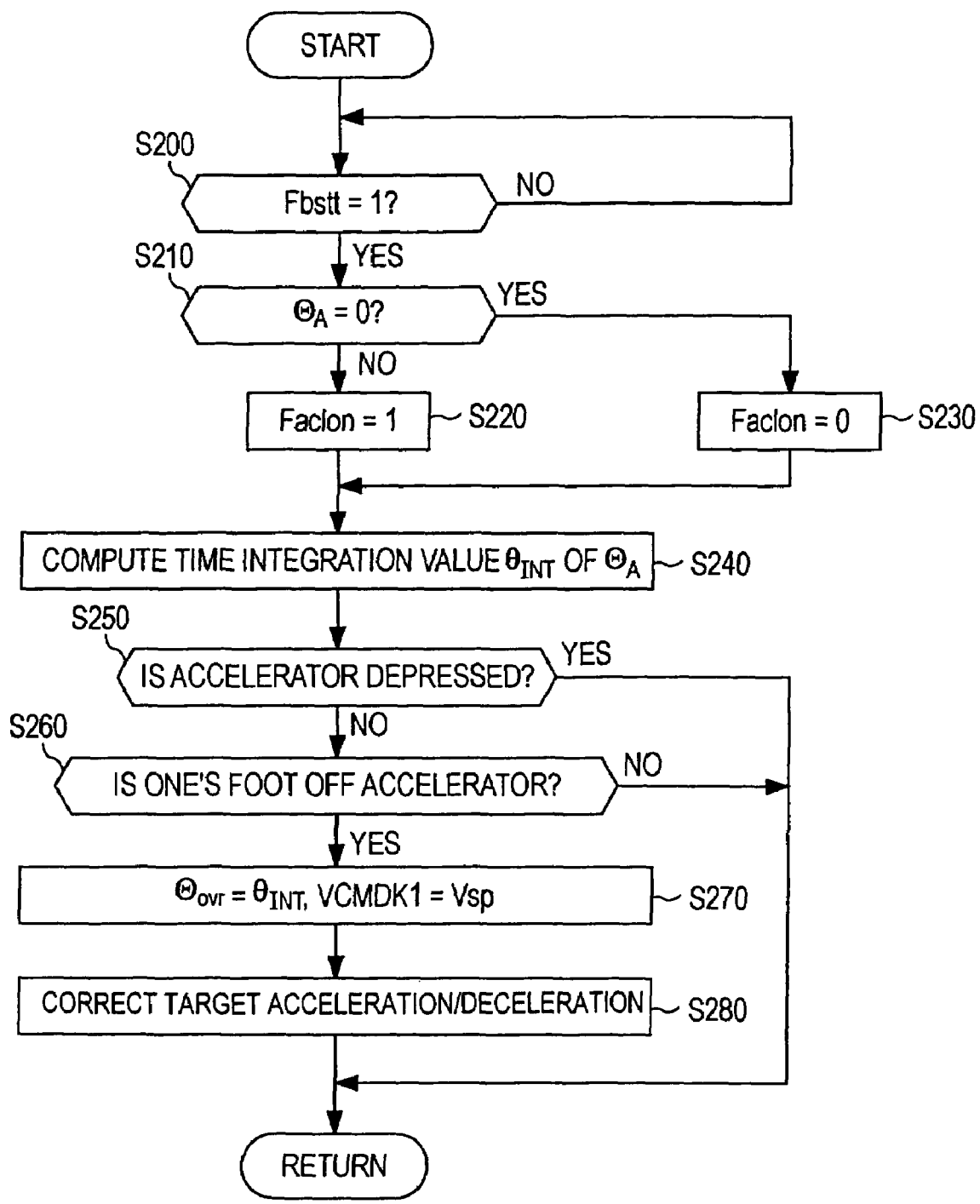
FIG. 6 is a flowchart of the steps of correcting a target deceleration.

In step S60 the target deceleration is corrected on the basis of the operation of the accelerator by the driver. The details of the correction will be described with reference to the flowchart shown in FIG. 6. Referring now to FIG. 6, in step S200 a determination is made as to whether or not the control start flag FBSTT is set to 1. If the control start flag FBSTT is set to 0, the controller 10 waits at step S200, whereas if the control start flag FBSTT is set to 1 the process advances to step S210.

In step S210 a determination is made as to whether or not an accelerator opening $\theta_A$ detected by accelerator opening sensor 2 is 0. If the accelerator opening $\theta_A$ is not 0, the process advances to step S220 to set a flag Faclon to 1 and then advances to step S240. In contrast, if the accelerator opening $\theta_A$ is 0 in response to the query of step S210, the process advances to step S230 to set the flag Faclon to 0 and then advances to step S240.

In step S240 a time integration value $\theta_{INT}$ of the accelerator opening $\theta_A$ is determined on the basis of the following formula (17). In formula (17), $\theta_{INTK1}$ represents a value set prior to one sampling of the time integration value $\theta_{INT}$ of the accelerator opening $\theta_A$, and $\Delta$ represents a sampling time.

$$\theta_{INT} = \theta_{INTK1} + \Delta \cdot \theta_A \quad (17)$$

In step S250 a determination is made as to whether or not the driver has depressed an accelerator pedal. The determination is performed based on the accelerator opening $\theta A$ detected by accelerator opening sensor 2. If the driver has depressed the accelerator pedal, the process advances to step S70 in the flowchart shown in FIG. 2. In contrast, if the driver has not depressed the accelerator pedal in step S250, the process advances to step S260.

In step S260 a determination is made as to whether or not the driver has taken his/her foot off the depressed accelerator pedal. The determination is also performed on the basis of the accelerator opening $\theta_A$ detected by accelerator opening sensor 2. If the driver has taken his/her foot off the depressed accelerator pedal, the process advances to step S270. Otherwise, the process advances to step S70 in the flowchart shown in FIG. 2.

In step S270 the time integration value $\theta_{INT}$ of the accelerator opening, which is calculated in step S240, is substituted for the value of $\theta_{ovr}$ that is used in an operation described later, and a vehicle speed Vsp detected by vehicle speed sensor 1 is substituted for a past value VCMDK1 of the target vehicle speed. Then, the process advances to step S280. When the value of the time integration value $\theta_{INT}$ of the accelerator opening is substituted for $\theta_{ovr}$, $\theta_{INT}$ is reset to 0.

In step S280 a target acceleration/deceleration is corrected based on a point where the driver operates the accelerator pedal, a point where the driver puts his/her foot off the accelerator pedal and a degree of depression of the accelerator pedal. Here it is determined that the larger the $\theta_{ovr}$ value, the larger the degree of depression of the accelerator pedal, and that the smaller the $\theta_{ovr}$ value, the smaller the degree of depression of the accelerator pedal. The target acceleration/deceleration is corrected so that the larger the degree of depression of the accelerator pedal the lower the degree of reduction of the target velocity speed for after the operation of the accelerator pedal by the driver, or so that when the degree of acceleration is large, the closer to the exit of the curve and the larger the degree of acceleration. The method of correcting the target acceleration/deceleration is described in detail below.

The first situation described is when the accelerator is operated at a vehicle position that is occupied before entering the entrance of the curve and that is disposed at a distance equal to or greater than a predetermined distance from the curve entrance.

Figure 7:
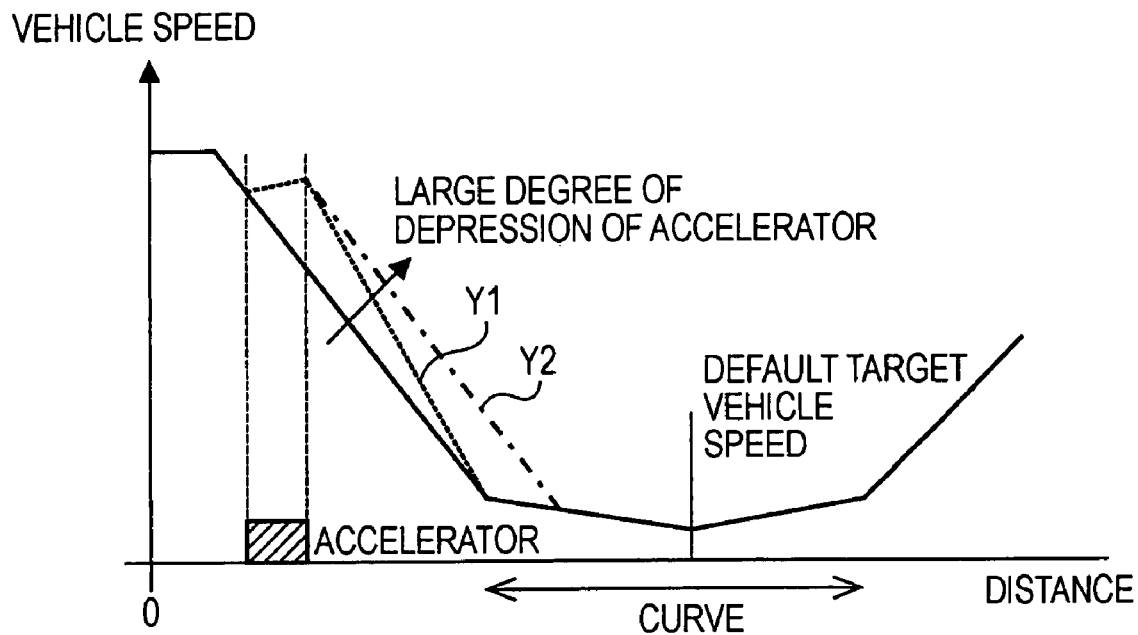
FIG. 7 shows a default target vehicle speed for when the vehicle travels into a curve and a target vehicle speed for when a driver operates an accelerator pedal at a point occupied before entering an entrance of the curve and that is disposed at a distance equal to or greater than a predetermined distance from the curve entrance.

FIG. 7 shows a default target vehicle speed for when the vehicle travels into a curve and a target vehicle speed for when a driver operates an accelerator pedal at a point that is occupied before entering the entrance of the curve and that is disposed at a distance equal to or greater than the predetermined distance from the curve entrance. In FIG. 7 a solid line represents the default target vehicle speed when the driver is not depressing the accelerator pedal. When the vehicle is traveling into the curve a deceleration control is operated. After the deceleration control is operated, when the driver operates the accelerator pedal at the point that is occupied before entering the curve entrance and that is disposed by at least the predetermined distance from the curve entrance, the driver thinks that a deceleration start timing is early. However, since the distance to the curve entrance is large it is inferred that the target vehicle speed for when the vehicle travels into the curve cannot be predicted.

In this case, the larger the degree of depression of the accelerator pedal, the smaller the target deceleration. Similarly, the smaller the degree of depression of the accelerator pedal, the larger the target deceleration. It is assumed that if the $\theta_{ovr}$ value is equal to or greater than a predetermined value, the degree of depression of the accelerator pedal is large. Conversely, if the $\theta_{ovr}$ value is less than the predetermined value, the degree of depression of the accelerator pedal is small. A dotted line Y1 in FIG. 7 represents a change in the target velocity speed when the degree of depression of the accelerator pedal is small, and an alternate long and short dash line Y2 represents a change in the target vehicle speed when the degree of depression of the accelerator pedal is large.

The target deceleration $\alpha_{ovr}$ when the degree of depression of the accelerator pedal is small is represented by the following formula (18):

$$\alpha_{ovr}=(Vsp^2-V_{CIN}^2)/(2 \cdot L_{CIN});\tag{18}$$

wherein Vsp is the current velocity speed;

$V_{CIN}$ is the default target vehicle velocity at the curve entrance; and $L_{CIN}$ is the distance to the curve entrance.

When the degree of depression of the accelerator pedal is large, the deceleration is controlled until the vehicle speed becomes equal to the default target vehicle speed by the default target deceleration (refer to Y2 in FIG. 7). That is, when the default target deceleration is set to $\alpha_D(L)$, the target deceleration $\alpha_{ovr}$ when the degree of depression of the accelerator pedal is large is given by the following formula (19):

$$\alpha_{ovr}=\alpha_D(L)\tag{19}$$

The next situation described is when the accelerator is operated at a vehicle position within a predetermined distance from the curve entrance.

Figure 8:
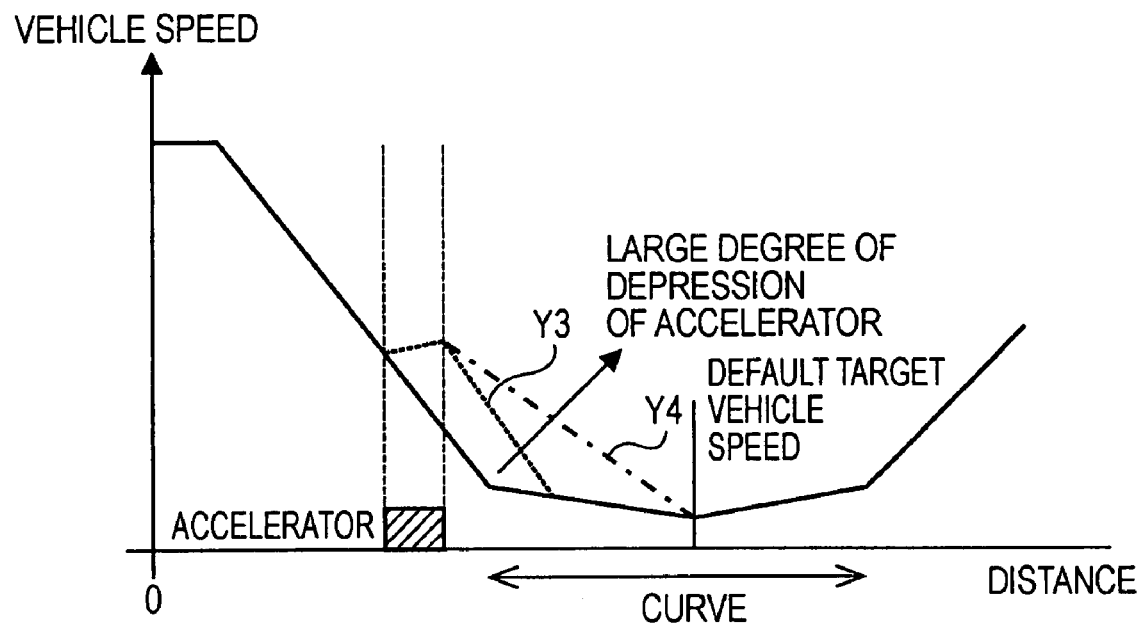
FIG. 8 shows a default target vehicle speed for when the vehicle travels into the curve and a target vehicle speed for when the driver operates the accelerator pedal at a point that is situated within a predetermined distance from the entrance of the curve.

FIG. 8 shows a default target vehicle speed for when the vehicle travels into the curve and a target vehicle speed for when the driver operates the accelerator pedal at a point that is situated within the predetermined distance from the entrance of the curve. In FIG. 8, a solid line represents the default target vehicle speed when the driver is not depressing the accelerator pedal. After the deceleration control is operated, when the driver operates the accelerator pedal at the point that is situated within the predetermined distance from the curve entrance, the driver thinks that a curve entering speed is low. However, it is inferred that the target vehicle speed at a point where the radius of the curve is a minimum cannot be predicted.

In this case, the larger the degree of depression of the accelerator pedal, the smaller the target deceleration. Similarly, the smaller the degree of depression of the accelerator pedal, the larger the target deceleration. A dotted line Y3 in FIG. 8 represents a change in the target velocity speed when the degree of depression of the accelerator pedal is small, and an alternate long and short dash line Y4 represents a change in the target vehicle speed when the degree of depression of the accelerator pedal is large.

When the degree of depression of the accelerator pedal is small, after the driver has taken his/her foot off the accelerator pedal, the deceleration is controlled until the vehicle speed becomes equal to the default target vehicle speed by the default target deceleration. That is, when the default target deceleration is set to $\alpha_D(L)$, the target deceleration $\alpha_{ovr}$ when the degree of depression of the accelerator pedal is small is given by the following formula (20):

$$\alpha_{ovr}=\alpha_D(L)\tag{20}$$

When the degree of depression of the accelerator pedal is large, the deceleration control is operated based on a deceleration that allows the vehicle speed to become equal to the default target vehicle speed at the point where the curve radius is a minimum. The target deceleration $\alpha_{ovr}$ in this case is represented by the following formula (21):

$$\alpha_{ovr}=(Vsp^2-V_{CMIN}^2)/(2 \cdot L_{CMIN});\tag{21}$$

wherein Vsp is the current velocity speed;

$V_{CMIN}$ is the default target vehicle velocity at the point where the curve radius is a minimum; and $L_{CMIN}$ is the distance to the point where the curve radius is a minimum.

The next situation described is when the accelerator is operated in an interval from the curve entrance and the point where the curve radius is a minimum.

FIG. 9 shows a default target vehicle speed when the vehicle travels into the curve, and a target vehicle speed when the driver operates the accelerator pedal at the interval from the entrance of the curve to the point where the curve radius is a minimum. In FIG. 9, a solid line represents the default target vehicle speed when the driver is not depressing the accelerator pedal. After the deceleration control is operated, when the driver operates the accelerator pedal at the interval from the curve entrance to the point where the curve radius is a minimum, it can be inferred that the driver thinks that a curve passing speed is low.

In this case also, the larger the degree of depression of the accelerator pedal, the smaller the target deceleration. Again, the smaller the degree of depression of the accelerator pedal, the larger the target deceleration. A dotted line Y5 in FIG. 9 represents a change in the target velocity speed when the degree of depression of the accelerator pedal is small, and an alternate long and short dash line Y6 represents a change in the target vehicle speed when the degree of depression of the accelerator pedal is large.

When the degree of depression of the accelerator pedal is small, the deceleration control is operated based on a deceleration that allows the vehicle speed to become equal to the default target vehicle speed at the point where the curve radius is a minimum. The target deceleration $\alpha_{ovr}$ in this case is represented by the following formula (22):

$$\alpha_{ovr}=(Vsp^2-V_{CMIN}^2)/(2 \cdot L_{CMIN})\tag{22}$$

When the degree of depression of the accelerator pedal is large, after the driver has taken his/her foot off the accelerator pedal the deceleration is controlled based on the default target deceleration until the vehicle reaches the point where the curve radius is a minimum. The target deceleration $\alpha_{ovr}$ for until the vehicle reaches the point where the curve radius becomes a minimum after the driver has taken his/her foot off the accelerator pedal is given by the following formula (23):

$$\alpha_{ovr}=\alpha_D(L) \quad (23)$$

In addition, at the points that follow the point where the curve radius is a minimum, the vehicle speed is maintained at a constant value until it becomes equal to the default target vehicle speed. Therefore, the target deceleration $\alpha_{ovr}$ to a point where the vehicle speed equals the default target vehicle speed is given by the following formula (24):

$$\alpha_{ovr}=0 \quad (24)$$

The following conditions exist when the accelerator is operated in an interval from the point where the curve radius is a minimum to the curve exit.

FIG. 9 shows a change in the vehicle speed when the driver depresses the accelerator pedal in the interval from the point where the curve radius is a minimum to the curve exit when the deceleration control is being operated. In this case also it is inferred that the driver thinks that the curve passing speed is low. Here again, the target acceleration/deceleration is determined on the basis of the degree of depression of the accelerator pedal.

When the degree of depression of the accelerator pedal is small, after the driver has taken his/her foot off the accelerator pedal, the vehicle speed is maintained at a constant value until it becomes equal to the default target vehicle speed. Therefore, the target deceleration $\alpha_{ovr}$ in the section to the point where the vehicle speed equals the default target vehicle speed is given by the following formula (25). A dotted line Y7 in FIG. 9 represents a change in the target vehicle speed when the degree of depression of the accelerator pedal is small.

$$\alpha_{ovr}=0 \quad (25)$$

When the degree of depression of the accelerator pedal is large, after the driver has taken his/her foot off the accelerator pedal, the deceleration is controlled on the basis of the default target deceleration. The target deceleration $\alpha_{ovr}$ in this case is given by the following formula (26). An alternate long and short dash line Y8 in FIG. 9 represents a change in the target vehicle speed when the degree of depression of the accelerator pedal is large.

$$\alpha_{ovr}=\alpha_D(L) \quad (26)$$

The following describes conditions when the accelerator is operated near the curve exit.

FIG. 10 shows a default target vehicle speed for when the vehicle is travels into the curve, and a target vehicle speed for when the driver depresses the accelerator pedal at a point that is within a predetermined distance from the curve exit (that is, near the curve exit) when the deceleration control is being operated. When the driver depresses the accelerator pedal near the curve exit when the deceleration control is being operated, it is inferred that the driver thinks that a curve exiting speed is low. Here also, a target acceleration/deceleration is determined on the basis of the degree of depression of the accelerator pedal.

When the degree of depression of the accelerator pedal is small, the vehicle is accelerated based on a default target acceleration until the default target vehicle speed is reached. The target acceleration $\alpha_{ovr}$ in this case is given by the following formula (27):

$$\alpha_{ovr}=\alpha_D(L) \quad (27)$$

When the degree of depression of the accelerator pedal is large, the vehicle is accelerated on the basis of a target acceleration $\alpha_D(L_{COUT})$ at the curve exit. The acceleration $\alpha_{ovr}$ in this case is given by the following formula (28):

$$\alpha_{ovr}=\alpha_D(L_{COUT}) \quad (28)$$

In step S280 in the flowchart shown in FIG. 6, when the target acceleration/deceleration is corrected by the previously described method based on the points where the driver operates the accelerator pedal and the driver takes his/her foot off the accelerator pedal and the degree of depression of the accelerator pedal, the process advances to step S70 in the flowchart shown in FIG. 2.

Figure 11:
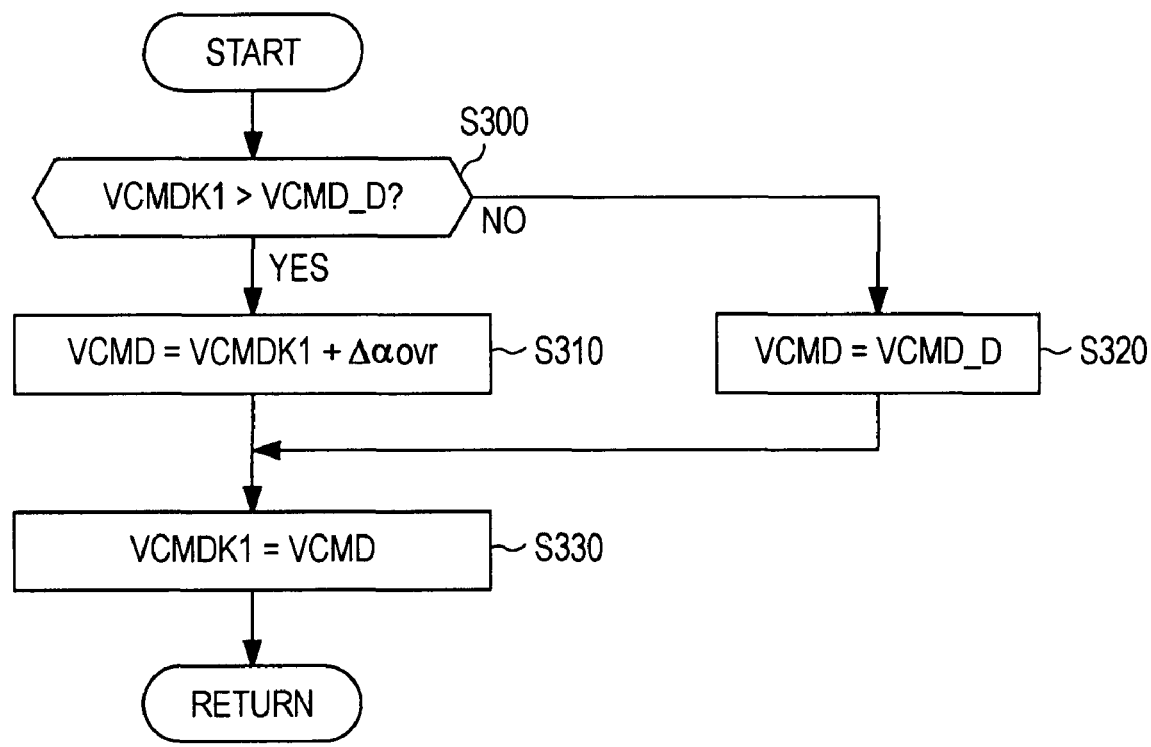
FIG. 11 is a flowchart of the steps of calculating a vehicle speed command value.

Turning now to FIG. 2, in step S70 a vehicle speed command value is calculated. The calculation of the vehicle speed command value is described with reference to the flowchart shown in FIG. 11. According to FIG. 11, in step S300 a determination is made as to whether or not the past value VCMDK1 of the target vehicle speed VCMD is greater than the target vehicle speed default value VCMD_D calculated in step S50 (see FIG. 2). When the operation of step S300 is performed first, the previous value VCMDK1 of the target vehicle velocity that has been set in step S270 (see FIG. 6), that is, the vehicle speed Vsp for immediately after the accelerator is operated, and the target vehicle speed default value VCMD_D are compared to each other. If the previous value VCMDK1 of the target vehicle speed is greater than the target vehicle speed default value VCMD_D, the process advances to step S310.

In step S310 the target vehicle speed VCMD is calculated by the following formula (29):

$$VCMD=VCMDK1+\Delta \cdot \alpha_{ovr}; \quad (29)$$

wherein $\Delta$ is the computation period; and $\alpha_{ovr}$ is the acceleration/deceleration corrected in step S280. When the target vehicle speed VCMD is calculated, the process advances to step S330.

In contrast, in step S300 if the previous value VCMDK1 of the target vehicle speed is equal to or less than the target vehicle speed default value VCMD_D, the process advances to step S320. In step S320 the target vehicle speed VCMD is calculated by the following formula (30), and the process advances to step S330.

$$VCMD=VCMD\_D \quad (30)$$

In step S330 the target vehicle speed VCMD calculated in step S310 or in step S320 is substituted for the previous value VCMDK1 of the target vehicle speed, and the process advances to step S80 in the flowchart shown in FIG. 2.

Turning now to FIG. 2, in step S80 a driving power command value FWCMD corresponding to the target vehicle speed VCMD calculated in step S70 is calculated. Here, the delay in transmission of a driving power controlling system can be ignored. What are to be controlled by the vehicle speed controlling system are a driving torque command value TWCMD as an input and the vehicle speed Vsp as an output as in the following formula.

$$Vsp(s)=GP(s) \cdot \{TWCMD(s)/RW+FG(s)+FD(s)\}; \quad (31)$$

$$GP(s)=1/(M \cdot s); \quad (32)$$

wherein RW is a tire radius;

s is a Laplace operator; and

M is the weight of the vehicle. External disturbances are represented by a sum FD of air resistance and rolling resistance and by a gradient resistance FG.

The sum FD of the air resistance and the rolling resistance in formula (31) is previously calculated on the basis of the following formula (33) and is added to the driving power command value so that the influences of the air resistance and the rolling resistance are removed.

$$FD=\mu A \cdot SV \cdot Vsp^2+\mu R \cdot M \cdot g; \quad (33)$$

wherein μA is an air resistance coefficient;
SV is a frontal projected area of the vehicle;
μR is a rolling resistance coefficient; and
g is the acceleration due to gravity.

For the gradient resistance FG, an estimated value FGH of the gradient resistance calculated based on the following formula (34) is used:

$$FGH(s)=GVP(s)\cdot Vsp(s)-GVH(s)\cdot FWCMD(s); \quad (34)$$

wherein $$GVH(s)=BVH(s)/AVH(s); \quad (35)$$

$$BVH(s)=\omega_{VH}; \quad (36)$$

$$AVH(s)=s+\omega_{VH}; \text{ and} \quad (37)$$

$$GVP(s)=GVH(s)/GP(s). \quad (38)$$

By computing the driving force command value FWCMD as shown in the following formula (39) using a driving power command value signal FWCMD0 that is described below, the influence of, for example, the gradient resistance on a transmission characteristic from the driving power command value signal FWCMD0 to the vehicle speed Vsp is removed.

$$FWCMD=FWCMD0-FGH \quad (39)$$

The driving shaft torque command value TWCMD is given by the following formula (40):

$$TWCMD=RW\cdot(FWCMD+FD) \quad (40)$$

If it is assumed that external disturbances on the transmission characteristic from the driving power command value signal FWCMD0 to the vehicle speed Vsp are removed by the described travel resistance compensation, the transmission characteristic from the driving power command value signal FWCMD0 to the vehicle speed Vsp is given by the following formula (41):

$$Vsp(s)=GP(s)\cdot FWCMD0(s) \quad (41)$$

By setting the driving power command value signal FWCMD0 to a value that is given by the following formula (42) in the above-described system, a response GV(s) from the vehicle speed command value VCMD to the actual vehicle speed Vsp is given by the following formula (43), where KSP represents speed gain:

$$FWCMD0=KSP\cdot(VCMD-Vsp); \quad (42)$$

$$GV(s)=BV(s)/AV(s); \quad (43)$$

wherein $$BV(s)=KSP/M; \text{ and} \quad (44)$$

$$AV(s)=s+(KSP/M). \quad (45)$$

From formulas (43) to (45), the response GV(s) is such that a steady gain corresponds to a time lag of a first order of 1, and the vehicle speed Vsp responds to the vehicle speed command value VCMD without a steady-state deviation.

Proceeding according to the flowchart of FIG. 2, in step S90 a brake fluid pressure command value and an engine torque command value for realizing the driving shaft torque command value TWCMD are computed. However, when the driver is depressing the accelerator, the brake fluid pressure command value is set to zero, and the engine torque command value is such that the accelerator operation of the driver is given priority.

When a torque amplification factor of a torque converter is RT, a speed change gear ratio is RAT, a differential gear ratio is RDEF, an engine inertia is JE, and an engine rotational speed is NE, the relationship between a driving shaft torque TW, an engine torque TE, and a brake torque TBR is given by the following formula (46):

$$TW=KGEAR\cdot\{TE-JE(dNE/dt)\}-TBR \quad (46)$$

$$KGEAR=RT\cdot RAT\cdot RDET \quad (47)$$

Here, the acceleration is limited to within a predetermined value due to, for example, an operation for controlling the following of a front vehicle by one's own vehicle. When the rate of change of the engine rotational speed is small, the influence of the engine inertia is considered as being small. When this engine inertia is set to zero, formula (46) can be represented by the following formula (48):

$$TW=KGEAR\cdot TE-TBR \quad (48)$$

From formula (48), an engine torque command value TER is determined on the basis of the driving shaft torque command value TWCMD by the following formula (49):

$$TER=TWCMD/KGEAR \quad (49)$$

Next, a determination is made as to whether or not the engine torque command value TER calculated by formula (49) is equal to or greater than an engine brake torque TE_IDLE. The engine brake torque TE_IDLE is generally set based on the engine rotational speed. Therefore, when a table map in which the relationship between the engine rotational speed and the engine brake torque TE_IDLE is set is previously provided, it is possible to determine the engine brake torque TE_IDLE based on the rotational speed.

If the engine torque command value TER is equal to or greater than the engine brake torque TE_IDLE, it is possible to achieve torque corresponding to the driving shaft torque command value based on the engine torque alone without using the brake. In contrast, if the engine torque command value TER is less than the engine brake torque TE_IDLE, a brake operation amount for causing the driving shaft torque to be equal to the command value is computed considering a control torque based on the engine brake torque.

Accordingly, distribution control laws between the engine torque command value TER and the brake torque command value TBR are as follows:

(i) When TER≧TE_IDLE, $$\text{TBR}=0 \text{ (brake liquid pressure command value PBR}=0\text{); and} \quad (50)$$

$$TER=TWCMD/KGEAR. \quad (51)$$

(ii) When TER<TE_IDLE, when the throttle opening is zero or when the engine torque for when the throttle is at an idle position is set to TE_IDLE, the driving shaft torque can be given by the following formula (52):

$$TW=KGEAR\cdot TE\_{IDLE}-TBR \quad (52)$$

Therefore, a brake torque in accordance with the following formula is produced based on the driving shaft torque command value TWCMD:

$$TBR=KGEAR\cdot TE\_{IDLE}-TWCMD \quad (53)$$

When a brake cylinder area is Ab, a rotor effective radius is Rb, and a pad friction coefficient is μb, the brake liquid pressure command value PBR, which is a brake operation amount, is given by the following formula (54) on the basis of the brake torque command value TBR:

$$PBR=TBR/KBRK \quad (54)$$

$$KBRK=8\cdot Ab\cdot Rb\cdot \mu b \quad (55)$$

The vehicle controller 10 outputs the computed engine torque command value TER to the engine controller 4 and the computed brake liquid pressure command value PBR to the brake actuator 5. The engine controller 4 controls the engine so that the engine torque equals the engine torque command value TER. The brake actuator 5 controls the brake on the basis of the brake liquid pressure command value PBR.

According to the vehicle travel controlling device and method of the first embodiment, in a device that accelerates/decelerates a vehicle on the basis of a target vehicle speed for when the vehicle travels along a curve calculated on the basis of a road curvature, when an operation of an accelerator pedal by a driver is detected during operation of a deceleration control, it is possible to correct the target vehicle speed based on an accelerator pedal operation amount and a vehicle position when the accelerator pedal is operated. Therefore, it is possible to perform an acceleration/deceleration controlling operation that reflects an intended acceleration operation of the driver.

In particular, according to the first embodiment, the target vehicle speed is corrected so that the larger the accelerator pedal operation amount, the smaller the degree of deceleration and the larger the degree of acceleration. Therefore, it is possible to perform an acceleration/deceleration controlling operation that reflects an intended acceleration operation of the driver.

According to the first embodiment, the target vehicle speed for after the operation of the accelerator pedal is corrected so that the closer the vehicle is to a curve exit, the smaller the degree of deceleration at the time of deceleration control and the larger the degree of acceleration at the time of acceleration control. Therefore, it is possible to perform a proper acceleration/deceleration controlling operation in accordance with the position where the accelerator pedal is operated.

In particular, according to the first embodiment, it is determined whether the position of the vehicle when the accelerator pedal is operated is situated in any of a section that is occupied before entering the curve entrance, in a section between the curve entrance and a point where a curve radius becomes a minimum and a section between the point where the curve radius becomes a minimum and the curve exit to determine the method of correcting the target vehicle speed. Therefore, it is possible to perform a proper acceleration/deceleration controlling operation in accordance with the position where the accelerator pedal is operated.

A vehicle travel controlling device and method according to a second embodiment differs from the vehicle travel controlling device according to the first embodiment in the operations that are performed in step S60 among the steps in the flowchart shown in FIG. 2. The second embodiment corrects a target deceleration when a deceleration controlling operation is performed based on an accelerator-pedal-release speed when a driver takes his/her foot off an accelerator pedal that was depressed by the driver during operation of the deceleration control. In other words, the higher the accelerator-pedal-release speed, the larger the target deceleration.

Figure 12:
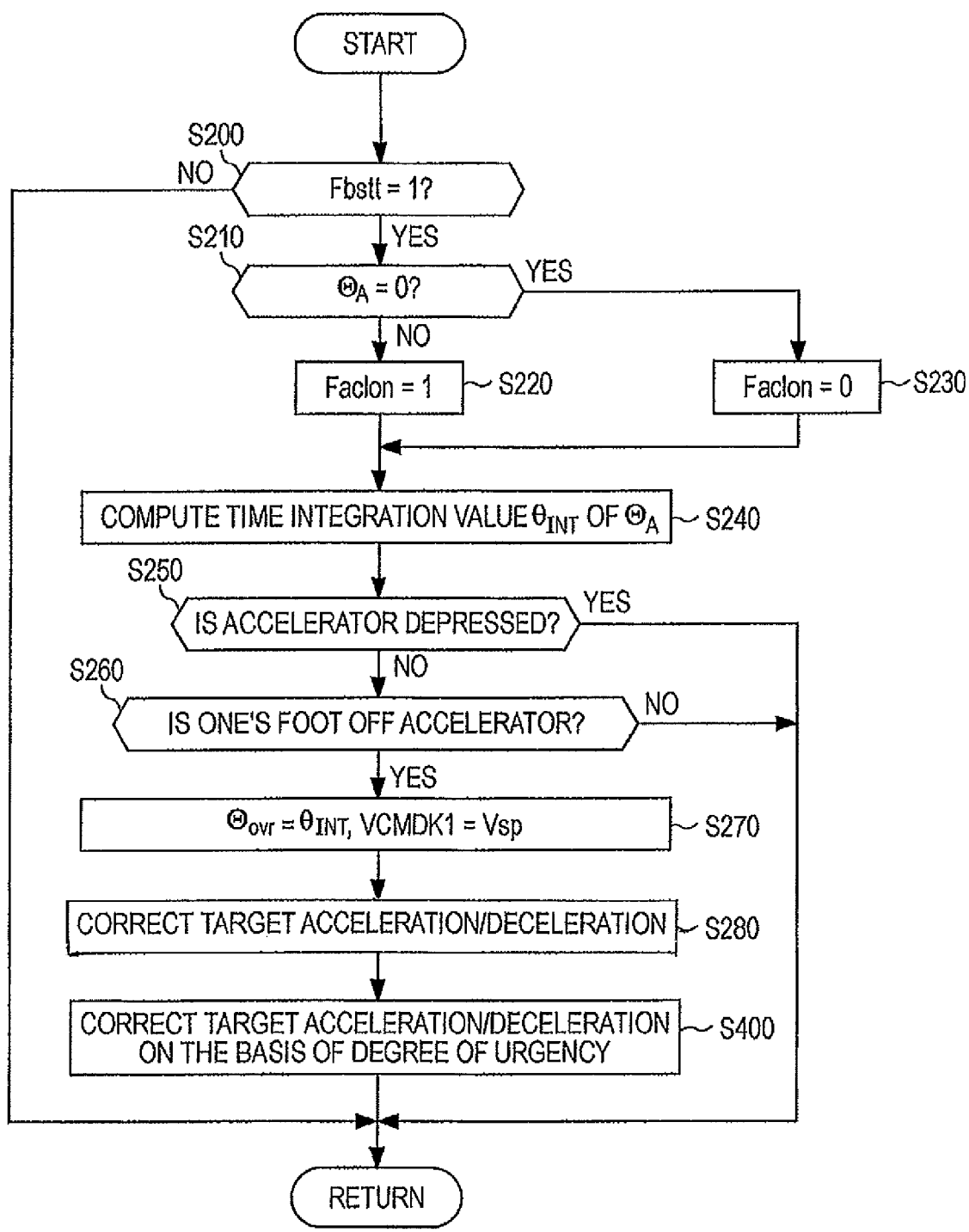
FIG. 12 is a flowchart of the steps of correcting a target deceleration in a vehicle travel controlling device according to a second embodiment.

The method of correcting the target deceleration will hereunder be described with reference to the flowchart shown in FIG. 12. Of the steps in the flowchart shown in FIG. 12, those that are the same as those in the flowchart shown in FIG. 6 are given the same reference numerals. The operations from step S200 to step S280 are the same.

In step S400, which follows step S280, the target deceleration for the deceleration controlling operation is corrected based on the accelerator-pedal-release speed. An accelerator-pedal-release speed $d\theta$ is given by the following formula (56):

$$d\theta=\{\theta(k)-\theta(k-1)\}/\Delta; \quad (56)$$

wherein $\Delta$ is the computation period;
$\theta(k)$ is a current accelerator opening value; and
$\theta(k-1)$ is a previous accelerator opening value.

If the accelerator-pedal-release speed $d\theta$ calculated by formula (56) is equal to or greater than a predetermined value $d\theta 1$, a determination is made that the driver has performed an operation of high urgency. Then, a predetermined deceleration $\alpha_{EMG}$ is substituted for the target deceleration $\alpha_{ovr}$. The predetermined deceleration $\alpha_{EMG}$ is a value (a large deceleration value) that is at least less than the target deceleration $\alpha_{ovr}$ corrected in step S280 so that it is set to a value that allows the target vehicle speed to be reduced quickly. In other words, in step S280 the target acceleration/deceleration $\alpha_{ovr}$ is corrected. When the accelerator-pedal-release speed $d\theta$ is equal to or greater than the predetermined value $d\theta 1$, the predetermined deceleration $\alpha_{EMG}$ is used without using the corrected target deceleration $\alpha_{ovr}$.

In contrast, if the accelerator-pedal-release speed $d\theta$ is less than the predetermined value $d\theta 1$, the target deceleration $\alpha_{ovr}$ corrected in step S280 is used as the target deceleration $\alpha_{ovr}$.

According to the second embodiment, if the accelerator-pedal-release speed is equal to or greater than the predetermined speed, the target deceleration is not corrected at least in the direction in which the deceleration is reduced. Therefore, for example, it is possible to prevent the deceleration of the vehicle from being reduced, the reduction in the deceleration being against the intention of the driver who suddenly takes his/her foot off the accelerator pedal because the driver felt the occurrence of an urgent situation.

A vehicle travel controlling device and method according to a third embodiment differs from the first embodiment in the operations that are performed in step S30 among the steps in the flowchart shown in FIG. 2. The third embodiment corrects a target vehicle speed on the basis of the precision with which the vehicle position is detected by the navigation device 3.

Figure 13:
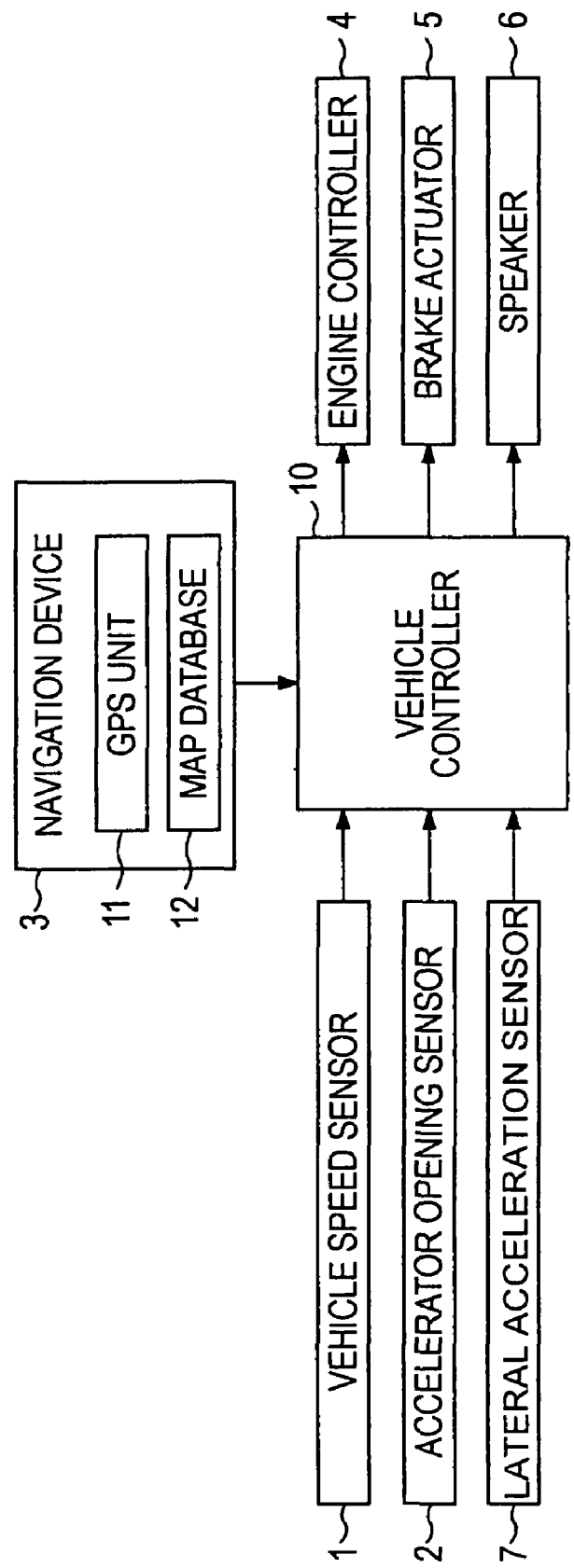
FIG. 13 shows a structure of a vehicle travel controlling device according to a third embodiment.

FIG. 13 shows a structure of the vehicle travel controlling device according to the third embodiment. In addition to the structural elements according to the first embodiment, the third embodiment includes a lateral acceleration sensor 7. Lateral acceleration sensor 7 detects a lateral acceleration $\alpha_{SNS}$ of the vehicle.

The method of correcting a target vehicle speed is next described. First, a lateral acceleration $\alpha_{YK}$ is calculated based on a vehicle speed and a curve radius at each node in front of the vehicle. Lateral acceleration sensor 7 detects the lateral acceleration $\alpha_{SNS}$. The lateral acceleration $\alpha_{YK}$ at a node $N_k$ is given by the following formula (57):

$$\alpha_{YK}=Vsp^2/R_k; \quad (57)$$

wherein the curve radius at the node $N_k$ is $R_k$; and
Vsp is the vehicle speed at the time of passage of the node $N_k$.

Figure 14:
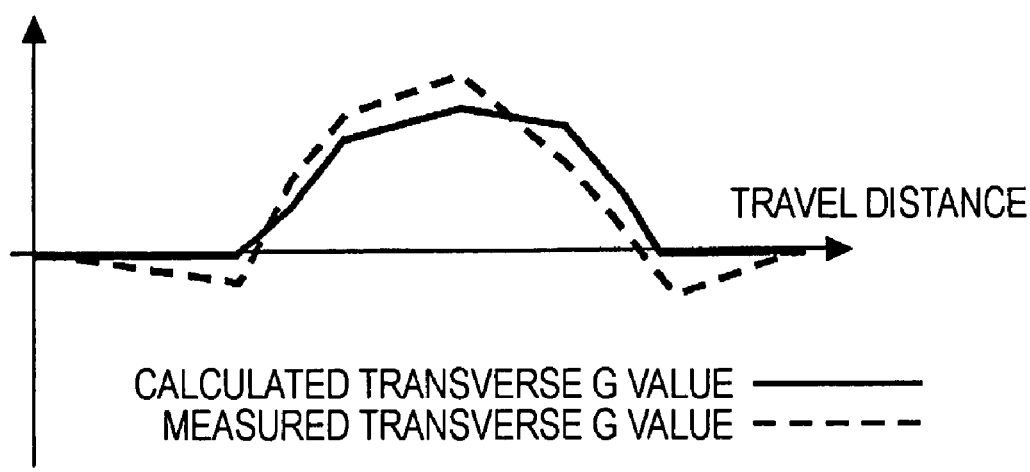
FIG. 14 shows an example of a relationship between a lateral acceleration $\alpha YK$ obtained by computation and a lateral acceleration $\alpha SNS$ detected by a lateral acceleration sensor.

FIG. 14 shows an example of a relationship between the lateral acceleration $\alpha_{YK}$ calculated based on formula (57) and the lateral acceleration $\alpha_{SNS}$ detected by lateral acceleration sensor 7. In FIG. 14, a solid line represents the lateral acceleration $\alpha_{YK}$ obtained by computation, and a broken line represents the lateral acceleration $\alpha_{SNS}$ detected by lateral acceleration sensor 7.

Then in the method, the absolute value of the difference between the lateral accelerations $\alpha_{YK}$ and $\alpha_{SNS}$, which are obtained for each node, that is, $|\alpha_{SNS}-\alpha_{YK}|$, is determined. Thereafter, a total sum $\alpha_{ESGM}$ in a distance $L_{io}$ from a curve entrance to a curve exit is determined, and the calculated total sum $\alpha_{ESGM}$ is divided by a curve interval distance $L_{io}$ to determine an error $\alpha_{EPM}$ per unit distance. If the determined error $\alpha_{EPM}$ per unit distance is equal to or less than a predetermined value, the precision with which the position is detected by the navigation device 3 is equal to or greater than a predetermined precision (that is, the position detection precision is high). In contrast, if the error $\alpha_{EPM}$ per unit distance is greater than the predetermined value, the precision with which the position is detected by the navigation device 3 is less than the predetermined precision (that is, the position detection precision is low).

When the position detection precision of the navigation device 3 is high, a degree of depression of the accelerator pedal at the curve is detected. If the detected degree of depression of the accelerator pedal is greater than a predetermined degree of depression, the predetermined lateral acceleration $\alpha y$ that is used when calculating the node passable vehicle speed $V_{ck}$ (step S30 in the flowchart shown in FIG. 2) is made large. The steps that are carried out after making the value of the lateral acceleration $\alpha_y$ large are the same as those that are carried out according to the first embodiment. That is, each node passable vehicle speed $V_{ck}$ is calculated on the basis of formula (10). By this, each node passable vehicle speed $V_{ck}$ is large.

According to the third embodiment, if the precision with which the vehicle position is detected is equal to or greater than the predetermined precision, a next target vehicle speed is calculated in accordance with an accelerator pedal operation amount. Therefore, it is possible to reflect in the calculation of the next target vehicle speed the intention of operation of the accelerator pedal by a driver. In other words, if the degree of depression of the accelerator pedal is greater than the predetermined degree of depression, each node passable vehicle speed (target speed) $V_{ck}$ is made large so that it is possible to calculate each target vehicle speed value that reflects the feel of driving of the driver.

In particular, according to the third embodiment, based on a position and state of the vehicle detected by the GPS unit 11, the vehicle lateral acceleration $\alpha_{YK}$ is calculated, and the vehicle lateral acceleration $\alpha_{SNS}$ is detected by lateral acceleration sensor 7. Then, a determination is made as to whether or not the precision with which the vehicle position is detected is equal to or greater than the predetermined precision based on the calculated lateral acceleration $\alpha_{YK}$ and the detected lateral acceleration $\alpha_{SNS}$. Therefore, it is possible to precisely determine the degree of precision of the detection of the vehicle position.

The invention is not limited to the above-described embodiments. For example, in the first embodiment, the method of correcting a target vehicle speed is determined in accordance with five cases, that is, (a) when the accelerator is operated at a vehicle position that is occupied before entering the curve entrance and that is disposed at a distance equal to or greater than a predetermined distance from the curve entrance, (b) when the accelerator is operated at a vehicle position within a predetermined distance from the curve entrance, (c) when the accelerator is operated in an interval from the curve entrance to the point where the curve radius is a minimum, (d) when the accelerator is operated in an interval from the point where the curve radius is a minimum to the curve exit, and (e) when the accelerator is operated near the curve exit. However, the road sections for determining the method of correcting a target vehicle speed are not limited to these five sections. For example, the road sections may be divided into the following three road sections: the section that is occupied before entering the curve, the section between the curve entrance and the point where the curve radius is a minimum and the section between the point where the curve radius is a minimum and the curve exit. Alternatively, there may be more than five sections.

Although in the first embodiment a target acceleration/deceleration is determined in accordance with whether the degree of depression of the accelerator pedal is large or small, the target acceleration/deceleration may be successively changed in accordance with the degree of depression of the accelerator pedal. For example, when the accelerator pedal is operated near the curve exit, it is possible to successively change the target acceleration in accordance with the degree of depression of the accelerator pedal with the default acceleration $\alpha_D(L)$ being a minimum value and the target acceleration $\alpha_D(L_{COUT})$ at the curve exit being a maximum value.

Although the time integration value $\theta_{INT}$ of the accelerator opening $\theta_A$ is used as the accelerator pedal operation amount, the accelerator opening $\theta_A$ itself may be used, or the number of depressions of the accelerator pedal at each section may be used. One depression of the accelerator pedal occurs when the driver puts his/her foot off the depressed accelerator pedal.

When the driver operates the accelerator pedal at a curved road having a radius that is equal to or greater than a predetermined value, that is, at a slight curve, the target vehicle speeds may be uniformly made high in all sections of the curved road. Here, it is desirable to adjust how much each target vehicle speed is to be increased in accordance with where the accelerator pedal is operated with respect to the curve.

The travel controlling device may be one that only controls deceleration up to the point where the curve radius is a minimum. More specifically, it may be a system in which the travel controlling device only controls deceleration and the driver manually accelerates the vehicle.

In the second embodiment, when the accelerator-pedal-release speed $d\theta$ is equal to or greater than the predetermined value $d\theta 1$, the predetermined deceleration $\alpha_{EMG}$ is substituted for the target deceleration $\alpha_{ovr}$. This predetermined deceleration $\alpha_{EMG}$ may be made a maximum deceleration of the deceleration controlling system. More specifically, under the condition in which the driver feels that an urgent situation has occurred, if the vehicle is decelerated by the maximum deceleration until the default target vehicle speed is reached, this may be very convenient for the driver.

Although the current position of the vehicle is detected by GPS unit 11, it is possible to determine it by self-contained navigation as a result of detecting the distance and direction of travel of the vehicle.

As is clear from the foregoing, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A control apparatus for a vehicle, the apparatus comprising:
   a vehicle position detector configured to detect a traveling position of the vehicle;
   an accelerator operation detector configured to detect an accelerator operation by a driver; and
   a controller operable to:
      calculate a target vehicular speed for cornering a curve in a path of the vehicle based on a radius of the curve;

control a vehicular speed based on the target vehicular speed; and calculate a corrected target vehicular speed to use as the target vehicular speed for controlling the vehicular speed in response to the acceleration operation detector detecting the accelerator operation by the driver, the corrected target vehicular speed based on the traveling position along the path of the vehicle where the accelerator operation is detected.

2. The control apparatus according to claim 1 wherein the accelerator operation detector is further configured to detect an amount of the accelerator operation; and wherein the controller is further operable to:

calculate the corrected target vehicular speed based on the traveling position along the path of the vehicle where the accelerator operation is detected and the amount of the accelerator operation detected by the accelerator operation detector.

3. The control apparatus according to claim 2 wherein the controller is operable to:

calculate the corrected target vehicular speed after an end of the acceleration operation such that a larger the amount of the accelerator operation, a smaller a degree of deceleration while controlling the vehicular speed based on the target vehicular speed.

4. The control apparatus according to claim 3 wherein the controller is operable to:

calculate an accelerator release speed; and end or do not start use of the corrected target vehicular speed as the target vehicular speed for controlling the vehicular speed based on the target vehicular speed in response to the accelerator release speed being equal to or greater than a predetermined speed.

5. The control apparatus according to claim 2 wherein the amount of the accelerator operation is based on at least one of an amount of depression of an accelerator, a time integration value of the amount of the depression of the accelerator, and a number of depressions of the accelerator.

6. The control apparatus according to claim 2 wherein the controller is operable to:

calculate the corrected target vehicular speed after an end of the accelerator operation such that a closer the position where the accelerator operation is detected is to an exit of the curve, a larger a degree of acceleration while controlling the vehicular speed based on the target vehicular speed.

7. The control apparatus according to claim 1 wherein the accelerator operation detector is further configured to detect an amount of the accelerator operation; and wherein the controller is operable to:

determine a precision with which the traveling position is detected by the vehicle position detector;

compare the precision to a predetermined precision; and calculate the corrected target vehicular speed in accordance with the amount detected by the accelerator operation detector responsive to the precision being equal to or greater than the predetermined precision.

8. The control apparatus according to claim 7, further comprising:

a lateral acceleration detector configured to detect an actual lateral acceleration of the vehicle when the vehicle passes along the curve; and wherein the controller is further operable to:

calculate an estimated lateral acceleration of the vehicle for when the vehicle passes along the curve before the vehicle passes along the curve, the estimated lateral acceleration based on the radius of the curve; and compare the precision to the predetermined precision based on the estimated lateral acceleration and the actual lateral acceleration.

9. The control apparatus according to claim 1 wherein the controller is operable to:

calculate the target vehicular speed for cornering the curve in the path of the vehicle based on the radius of the curve by calculating the target vehicular speed in a first section from a location before entering the curve to an exit of the curve;

control the vehicular speed based on the target vehicular speed by controlling at least one of deceleration and acceleration of the vehicle based on the target vehicular speed; and calculate the corrected target vehicular speed after an end of the accelerator operation such that a larger an amount of the accelerator operation, a larger a degree of acceleration while controlling the vehicular speed based on the target vehicular speed.

10. The control apparatus according to claim 1 wherein the controller is operable to:

calculate the corrected target vehicle speed for after an end of the accelerator operation such that a closer the traveling position where the accelerator operation is detected is to an exit of the curve, a smaller a degree of deceleration while controlling the vehicle speed based on the target vehicular speed.

11. The control apparatus according to claim 1 wherein the traveling position where the accelerator operation is detected is at least one of a vehicle position when the accelerator operation is started, a vehicle position when the accelerator operation is completed and a section of the curve at which an accelerator pedal is operated.

12. The control apparatus according to claim 1, further comprising:

a plurality of sections forming the curve; and wherein the controller is operable to:

calculate the corrected target vehicular speed based on which of the plurality of sections the traveling position where the accelerator operation is detected occurs.

13. The control apparatus according to claim 12 wherein the plurality of sections forming the curve comprises a first section occupied before entering a curve entrance, a second section between the curve entrance and a point where the radius of the curve is a minimum and a third section between the point where the radius of the curve radius is a minimum and an exit of the curve.

14. The control apparatus according to claim 1, further comprising:

a plurality of sections forming the curve; and wherein the controller is operable to:

calculate the corrected target vehicle speed by increasing the target vehicle speed at all sections of the curve responsive to the driver performing the acceleration operation and the radius of the curve being equal to or greater than a predetermined value.

15. A control apparatus for a vehicle, the apparatus comprising:

means for detecting a traveling position of the vehicle;

means for detecting an accelerator operation by a driver;

means for calculating a target vehicular speed for cornering a curve in a path of the vehicle based on a radius of the curve;

means for correcting the target vehicular speed based the traveling position where the accelerator operation is detected by the accelerator operation detecting means; and means for controlling a vehicular speed based on the target vehicular speed.

16. A control method for a vehicle, the method comprising:

detecting an accelerator operation by a driver;

calculating a target vehicular speed for cornering a curve in a path of the vehicle based on a radius of the curve;

controlling a vehicular speed based on the target vehicular speed; and calculating a corrected target vehicular speed to use as the target vehicular speed for controlling the vehicular speed in response to detecting the acceleration operation by the driver, the corrected target vehicular speed based on a position of the vehicle with respect to the curve where the accelerator operation is detected.

17. The control method according to claim 16, further comprising:

detecting an amount of the accelerator operation; and wherein calculating the corrected target vehicular speed comprises calculating the corrected target vehicular speed based on the position and the amount.

18. The control method according to claim 17 wherein calculating the corrected target vehicular speed based on the position and the amount comprises calculating the corrected target vehicular speed such that a larger the amount, a smaller a degree of deceleration while controlling a vehicular speed based on the target vehicular speed.

19. The control method according to claim 16, further comprising:

calculating an accelerator release speed; and ending or not starting use of the corrected target vehicular speed as the target vehicular speed for controlling the vehicular speed in response to the accelerator release speed being equal to or greater than a predetermined speed.

20. The control method according to claim 16 wherein calculating the corrected target vehicular speed comprises calculating the corrected target vehicular speed such that a closer the position is to an exit of the curve, a larger a degree of acceleration while controlling a vehicular speed based on the target vehicular speed.

* * * * *